(12) United States Patent
Jones et al.

(10) Patent No.: US 11,009,375 B2
(45) Date of Patent: May 18, 2021

(54) METHODOLOGY FOR IN SITU CHARACTERIZING AND CALIBRATING AN ENTANGLED PHOTON DISTRIBUTION SYSTEM

(71) Applicant: U.S. Army Research Laboratory ATTN: RDRL-LOC-I, Adelphi, MD (US)

(72) Inventors: Daniel E. Jones, Middle River, MD (US); Brian T. Kirby, Baltimore, MD (US); Michael Brodsky, Millburn, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 210 days.

(21) Appl. No.: 16/002,906

(22) Filed: Jun. 7, 2018

(65) Prior Publication Data

US 2019/0376820 A1    Dec. 12, 2019

(51) Int. Cl.
*G01J 1/42* (2006.01)
*G01D 5/353* (2006.01)
(Continued)

(52) U.S. Cl.
CPC .......... *G01D 5/3537* (2013.01); *G01N 21/65* (2013.01); *H01S 3/094076* (2013.01); *H01S 3/1086* (2013.01); *H04L 9/0852* (2013.01)

(58) Field of Classification Search
CPC ............. H01S 3/094076; H01S 3/1086; H04L 9/0852; G01D 5/3537; G01N 21/65
(Continued)

(56) References Cited

U.S. PATENT DOCUMENTS 9,500,930 B1 * 11/2016 Soh ................ G02F 1/3536
2004/0037531 A1 * 2/2004 Andrews ............ G02B 6/138
385/130
(Continued)

OTHER PUBLICATIONS

D. N. Klyshko, "Use of two-photon light for absolute calibration of photoelectric detectors," Sov. J. Quantum Electron. 10, 1112-1117 (1980) (paper in Russian, abstract in English on last page).
(Continued)

*Primary Examiner* — Georgia Y Epps
*Assistant Examiner* — Kevin Wyatt
(74) *Attorney, Agent, or Firm* — Eric B. Compton

(57) ABSTRACT

A novel methodology for characterizing and calibrating an entangled photon distribution system is disclosed. The entangled photon distribution system includes at least a source of entangled photon pairs, two photon detectors which detect photons among two channels and a controller. The methodology includes: for at least two different operational setting levels of the source of entangled photon pairs, measuring count rates for photons detected by the two photon detectors, individually and coincidently; fitting the measured individual and coincidence count rate data for the at least two different operational setting levels with theoretical models of detection probability; and determining operational parameters of the system from the fitting. The determined operational parameters of the system include the rate of generated entangled photon pairs by the source, the rates of Raman-scattered photons generated in the first and second channels, respectively, and the efficiency of the two photon detectors, respectively.

18 Claims, 6 Drawing Sheets

ENTANGLED PHOTON DISTRIBUTION SYSTEM

(51) Int. Cl.
*H04L 9/08* (2006.01)
*H01S 3/108* (2006.01)
*H01S 3/094* (2006.01)
*G01N 21/65* (2006.01)

(58) Field of Classification Search
USPC .................................................. 250/227.14
See application file for complete search history.

(56) References Cited

U.S. PATENT DOCUMENTS

| | | | | |
|---|---|---|---|---|
| 2007/0094180 | A1* | 4/2007 | Rifkin .................. | G06K 9/6215 706/20 |
| 2008/0013163 | A1* | 1/2008 | Leonardo ................ | G02F 1/353 359/341.31 |
| 2011/0276296 | A1* | 11/2011 | Walmsley ................ | G01J 11/00 702/85 |
| 2012/0063596 | A1* | 3/2012 | Brodsky ................ | H04B 10/70 380/256 |
| 2016/0067780 | A1* | 3/2016 | Zediker ................ | B22F 3/1055 219/76.12 |
| 2018/0107937 | A1* | 4/2018 | Bennett .................. | G06N 10/00 |

OTHER PUBLICATIONS

M. Fiorentino, P. L. Voss, J. E. Sharping, and P. Kumar, "All fiber photon-pair source for quantum communications," IEEE Photon. Technol. Lett. 14, 983-985 (2002).

K.F. Riley, M.P. Hobson, and S.J. Bence, Mathematical Methods for Physics and Engineering, 3rd edition (Cambridge University Press, 2006), pp. 1271-1277.

Sergey V. Polyakov and Alan L. Migdall, "High accuracy verification of a correlated photon-based method for determining photon counting detection efficiency," Optics Express, vol. 15, No. 4, Feb. 19, 2007, pp. 1390-1407.

X. Li, et al, "Quantum efficiency measurement of single-photon detectors using photon pairs generated in optical fibers," J. Opt. Soc. Am. B 27, 1857-1865 (2010).

X. Ma, L. Yang, X. Guo, and X. Li, entitled "Generation of photon pairs in dispersion shift fibers through spontaneous four wave mixing: Influence of self-phase modulation," Opt. Commun. 284, 4558-4562 (2011).

J. Oh, C. Antonelli, and M. Brodsky, entitled "Coincidence rates for photon pairs in wdm environment," J. LightwavecTechnol. 29, 324-329 (2011).

Entangled Photon Source (EPS): EPS-1000 webpage, NuCrypt © 2017, available at: http://nucrypt.net/EPS-1000.html.

Nucrypt Software: Quantum System Control Software webpage, NuCrypt © 2017, available at: http://nucrypt.net/quantum-system-control-software.html.

"NonlinearModelFit" function webpage, © 2018 Wolfram, available at: http://reference.wolfram.com/language/ref/NonlinearModelFit.html.

D. E. Jones, B. T. Kirby and M. Brodsky, "In-situ calibration of fiber-optics entangled photon distribution system," 2017 IEEE Photonics Society Summer Topical Meeting Series (SUM), San Juan, 2017, pp. 123-124 (originally presented at 2017 IEEE Photonics Society Summer Topical Meeting, San Juan, Jul. 10-12, 2017).

Poster titled "Characterization of detector efficiencies with a high intensity source of entangled photon pairs in the presence of Raman noise," by D.E. Jones, B.T. Kirby, and M. Brodsky, on display at presentation of same title at the Single Photon Workshop 2017, Boulder, CO, Jul. 31-Aug. 4, 2017.

D. E. Jones, B. T. Kirby, and M. Brodsky, "Joint Characterization of Two Single Photon Detectors with a Fiber-based Source of Entangled Photon Pairs," Frontiers in Optics 2017, OSA Technical Digest (online) (Optical Society of America, 2017), paper JW4A.37 (originally presented at Frontiers in Optics 2017, Washington, DC, Sep. 18-21, 2017).

* cited by examiner

ENTANGLED PHOTON DISTRIBUTION SYSTEM

METHOD FOR *IN SITU* CHARACTERIZING AND CALIBRATING AN ENTANGLED PHOTON DISTRIBUTION SYSTEM

200

> For at least two different operational setting (OS) levels of the source of entangled photon pairs, measure count rates for photons detected by the two photon detectors, individually ($s_1, s_2$) and coincidently ($c_{12}$)
> 210

> Fit the measured individual and coincidence count rate data ($s_1, s_2, c_{12}$) for the at least two different operational setting levels with theoretical models of detection probability (See Eqs. 12/13)
> 220

> Determine the five operational parameters ($\mu, r_1, r_2, \eta_1, \eta_2$) of the system from the fitting
> 230

FIG. 2A

MEASURING COUNT RATES

MEASURED COUNT RATES VERSUS ATTENUATION ALONG WITH CURVE FITTING WITH THEORETICAL MODELS OF DETECTION PROBABILITY

MEASURED COUNT RATES VERSUS PUMP POWER ALONG WITH CURVE FITTING WITH THEORETICAL MODELS OF DETECTOR PROBABILITY (AND SHOWING THE CONSITUTENT CONTRIBUTIONS IN THE MODELS)

ENTANGLED PAIR GENERATION RATE μ AND THE RAMAN-SCATTERED NOISE PHOTON RATES $r_1$ AND $r_2$ IN EACH CHANNEL AS A FUNCTION OF ATTENUATION DETERMINED BY FITTING

METHODOLOGY FOR IN SITU CHARACTERIZING AND CALIBRATING AN ENTANGLED PHOTON DISTRIBUTION SYSTEM

GOVERNMENT INTEREST

The embodiments herein may be manufactured, used, and/or licensed by or for the United States Government without the payment of royalties thereon.

FIELD

The invention relates to generating and using entangled photons, and in particular, to a novel methodology for in-situ characterization and calibration of entangled photon distribution systems.

BACKGROUND OF THE INVENTION

Entanglement is a key feature in quantum information science, and provides a resource which can be exploited for secret communications, computation, and enhanced sensing. The creation of entanglement can be achieved using a fourwave mixing source in nonlinear optical media such as optical fibers. Unfortunately, the creation of entanglement in this way is not without noise in the form of Raman-scattered photons which reduce the usefulness of the created entangled photons. To properly characterize such a source of entanglement it is generally necessary to separately measure either the detector efficiencies or the amount of Raman noise in a system and use these as inputs into a characterization model.

Entangled photon sources are required for quantum networking applications. Historically, these entangled photon sources generated entangled photon pairs using various bulk crystals ($\chi^{(2)}$ nonlinearity). However, entangled sources using four-wave-mixing (FWM) in the zero-dispersion region of optical fibers ($\chi^{(3)}$ nonlinearity) have recently been developed as disclosed in the publication M. Fiorentino, P. L. Voss, J. E. Sharping, and P. Kumar, "All-fiber photon-pair source for quantum communications," IEEE Photon. Technol. Lett. 14, 983-985 (2002). These sources have the benefit of the generated signal and idler photons being inherently fiber-based. This allows low-loss coupling to existing fiber networks for long distance distribution of entanglement. However, Raman-scattered noise photons are generated in addition to the entangled pairs with a fiber-based source, and steps must be taken to reduce their effect on the system's performance. Likewise, the Raman-scattered photons result in additional difficulties when characterizing the source and its detectors.

In order to fully characterize an entangled photon source and detection system, the photon generation rates (FWM pairs and Raman-scattered photons), channel transmission, and detector efficiencies must be known.

The proper use of an entangled photon distribution system necessitates a calibration procedure, which entails the determination of the photon generation rates (both FWM signal-idler pairs and Raman-scattered noise photons) and detector efficiencies (which are less than 100% for telecom band InGaAs avalanche photodetectors). The difficulty in assessing these efficiencies lies in the absence of deterministic single photon sources. The historic solution proposed by D. N. Klyshko, "Use of two-photon light for absolute calibration of photoelectric detectors," Sov. J. Quantum Electron. 10, 1112 (1980) utilizes a photon pair source to accurately determine the efficiency of single photon detectors (SPDs). SPDs have been very accurately characterized using this method with crystal-based entanglement sources. However, it is difficult to apply this method to fiber-based systems due to the presence of Raman-scattered noise photons. Therefore, the determination of detector efficiencies with a fiber-based source has required additional measurements to quantify the amount of Raman-scattered noise photons that are generated. Likewise, determination of the source parameters (both signal/idler and Raman photon generation rate) requires a calibrated detector in the first place.

There is a need for a convenient method to simultaneously characterize both SPDs and a fiber-based entangled photon source. Particularly, the method should allow an in-situ calibration, which requires no disassembling of the system (i.e. no disconnecting fibers) and no additional equipment.

SUMMARY OF INVENTION

Embodiments of the present invention are directed to a novel methodology for in-situ characterization and calibration of entangled photon distribution systems.

According to an embodiment, a method for characterizing and calibrating an entangled photon distribution system having a source of entangled photon pairs, and two photon detectors which detect photons among two channels is provided. The method includes: for at least two different operational setting levels of the source of entangled photon pairs, measuring count rates for photons detected by the two photon detectors, individually and coincidently; fitting the measured individual and coincidence count rate data for the at least two different operational setting levels with theoretical models of detection probability; and determining operational parameters of the system from the fitting.

The determined operational parameters of the system include: $\mu$, the rate of generated entangled photon pairs by the source; $r_1$ and $r_2$, the rates of Raman-scattered photons generated in the first and second channels, respectively; and $\eta_1$ and $\eta_2$, the efficiency of the two photon detectors, respectively. For the method, (i) a power setting, (ii) an attenuation setting, or (iii) a device-specific attenuation setting may be used for the at least two different operational setting levels of the source of entangled photon pairs.

Measuring count rates for photons detected by the two detectors involves initializing the two photon detectors for counting; detecting individual photons and coincidences by the two photon detectors over a time period; and dividing the detected number of single and coincidence counts by the measurement time to give measured count rates for the two detectors individually and coincidently. For instance, the actual time that transpired during the period or the gate timing of the detectors over the period may be used for the measurement time.

In addition, this process includes changing the operational setting level of the source of entangled photon pairs to a known value or by a known fixed spacing amount after measurement of the count rate for photons detected by the two photon detectors; and using the changed value for the operational setting level of the photon source in a subsequent measurement of the count rate for photons detected by the two detectors.

At least one of the operational settings of the source of entangled photon pairs may be in a higher-power regime than ordinary used for operation. Performing a measurement in a higher-power regime allows for faster and/or more accurate measurements than measurements performed in the lower-power regime.

The theoretical models of detection probability derived by the inventors include a theoretical model for the count rate of a single photon being detected and a theoretical model for the coincidence rate of the two photons being detected. The theoretical models may be given as functions of power as set forth in Equations 12a, 12b, and 12c, below. Or the theoretical models might be given as functions of attenuation as set forth in Equations 13a, 13b, and 13c, below. Preferably, there are no approximations with respect to power or attenuation made in these theoretical models.

In determining the operational parameters of the system from the fitting, a weighted nonlinear least squares regression technique may be performed to solve for unknowns.

The method may further include determining the transmission rate of photons for each channel. Moreover, the method further can include: selecting at least one operational parameter of the system as determined; and operating the system with an operational setting corresponding to the selected at least one operational parameter. Advantageously, the method does not require additional equipment or one to disassemble and reassemble the system when switching from the characterization and calibration method to the operating process.

According to another embodiment, an entangled photon distribution system includes a source which generates pairs of entangled photon pairs; two photon detectors which detect photons among two channels; and a controller is provided. The controller is configured to: for at least two different operational setting levels of the source of entangled photon pairs, measure count rates for photons detected by the two photon detectors, individually and coincidently; fit the measured individual and coincidence count rate data for the at least two different operational setting levels with theoretical models of detection probability; and determine operational parameters of the system from the fitting.

The source of entangled photon pairs may include: a laser which emits pulses used to generate entangled pairs of photons; a non-linear medium for generating entangled photons pairs from pulses emitted by the laser; and a filter for selectively separating photons for transmission among the two channels. In some instances, the photon source is configured to generate entangled photon pairs by Four-Wave Mixing (FWM).

According to yet another embodiment, a controller for use with an entangled photon distribution system having a source of entangled photon pairs, and two photon detectors which detect photons among two channels is provided. The controller is configured to execute machine-executable instructions enabling the controller to implement a method comprising: for at least two different operational setting levels of the source of entangled photon pairs, measuring count rates for photons detected by the two photon detectors, individually and coincidently; fitting the measured individual and coincidence count rate data for the at least two different operational setting levels with theoretical models of detection probability; and determining operational parameters of the system from the fitting.

These and other embodiments will be described in further detail below with respect to the following figures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

FIG. 2A is a flow chart of a method according to embodiments of the present invention.

Figure 1:
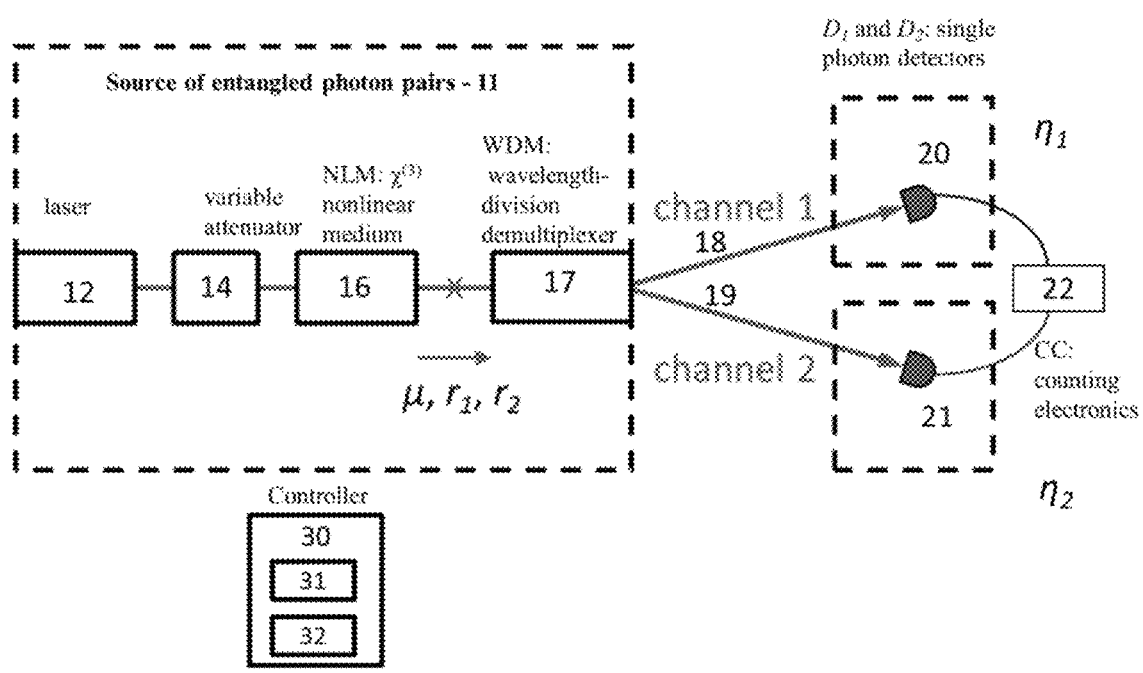
FIG. 1 is a schematic block diagram of an entangled photon distribution system according to embodiments of the present invention.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION OF EMBODIMENTS

Embodiments of the present invention are directed to a novel methodology for in-situ characterizing and calibrating entangled photon distribution systems. Specifically, the methodology simultaneously determines various operational parameters of the system. Characterization and calibration of the system is achieved in-situ.

A key aspect of this methodology is the use of measurements of the single and coincidental count rates of two detectors of the system using different photon source settings, i.e., laser pump power or attenuation levels, as measurements of the probabilities of detection of single and coincidental photons of the two detectors. The inventors have found that as few as two of the photon count rate measurements at different setting levels are generally sufficient to fully characterize the system. Preferably, at least one measurement is performed with an operational setting level in the high power regime.

The measured count rates for the at least two different photon source setting levels are mathematically fitted with theoretical detection probability models. The theoretical models include all higher-order terms which have been largely ignored by conventional methods, thus allowing calibration of the system over a broad range of pump powers. From this fit, the system operational parameters are determined. They include the entangled photon pairs generation rate, the Raman-scattered photon rates, and the detector efficiencies.

The advantages of novel methodology are the ability to characterize the entanglement system and its individual parts at previously unattainable high power levels; the ability to characterize an entanglement source without the need of disassembling system and using special calibration equipment to independently measure the Raman noise arising from the nonlinear conversion; the ability to characterize the system in-situ without the need of any additional calibration equipment.

Various embodiments of the present invention can be used to characterize and calibrate entanglement sources and detectors which could be part of communication or information processing systems.

FIG. 1 is a schematic of an entangled photons distribution system used in according to embodiments of the present invention.

The entanglement distribution system 10 generally comprises a source of entangled photon pairs 11 comprising a laser 12, a variable attenuator 14, a nonlinear medium or NLM 16 and a wavelength division demultiplexer or WDM 17 for emitting entangled photon pairs, one of the pair entering the first channel 18 and the other of the pair entering the second channel 19. Single photon detectors 20 and 21 record photons from channels 18 and 19, respectively. Coincident counting electronics 22 record coincidences of the photons recorded by both detectors 20 and 21.

The laser 12 emits pulses of light (photons) used to generate the entangled pairs of photons. The variable attenuator 14 controls the attenuation/power of the laser 12.

The NLM 16 is a nonlinear optical media that generates entangled photons from pulses emitted by the laser. As mentioned above, historically entangled photon pairs have been generated using various bulk crystals with $\chi^{(2)}$ nonlinearity. And more recently and preferred, optical fibers having $\chi^{(3)}$ nonlinearity are used. The creation of entanglement can be achieved using a four-wave mixing source in non-linear optical fibers in some implementations. "Four-wave mixing" or FWM is an intermodulation phenomenon in non-linear optics, whereby interactions between two or three wavelengths produce two or one new wavelengths. It is similar to the third-order intercept point in electrical systems. Four-wave mixing can be compared to the intermodulation distortion in standard electrical systems. It is a parametric nonlinear process, in that the energy of the incoming photons is conserved. FWM is a phase-sensitive process, in that the efficiency of the process is strongly affected by phase matching conditions.

Wavelength-division multiplexing (WDM) is a technique which multiplexes a number of optical carrier signals onto a single optical fiber by using different wavelengths (i.e., colors) of laser light. This technique enables bidirectional communications over one strand of fiber, as well as multiplication of capacity. Thus, a wavelength division demultiplexer element 17 such as a filter is used to separate distinct carrier signals from the optical fiber NLM 16 for transmission among the first and second channels 18 and 19. The channels 18, 19 may be optical fibers connecting to photon detectors 20 and 21, respectively, The photon detectors $D_1$ (20) and $D_2$ (21) may be single photon detectors. Each of the photon detectors 20 and 21 is configured and positioned so as to measure the number of individual photon detection events for first and second channels 18 and 19, respectively. The detection events for the individual detectors 20 and 21 are known as "single counts." Together with the coincident counting electronics 22 record coincidences of the photons recorded by both detectors 20 and 21 at substantially the same time. These are known as "coincidence counts."

The photon detectors 20 and 21 may be "gated" meaning that they are configured to detect only while "looking" for photons and able to detect them in small, periodic windows (known as a gate). This is due to technical reasons of how the detectors operate. The source of entangled photon pairs 11 generates photon pairs using a pulsed laser 12 which outputs one pulse every 20 ns (nanoseconds). This means that the laser 12 is essentially 'off' for 20 ns, then it outputs a very short pulse (10 picoseconds) and afterwards is 'off' again for 20 ns. The source 11 can only generate the entangled photon pairs when the laser pulse is 'on'. Because of this, the system's timing is set up such that the detector gate window is at the same time as when photons generated by the pulse arrive at the detectors (so the detectors $D_1$ and $D_2$ are only looking for photons in the time frame surrounding the time that we expect our photon pairs to arrive). An oversimplification of the process (but useful for understanding) is to say that the detectors 20 and 21 are off when the pulse is off, and they are on when the pulse is on. Since the gates occur whenever there is a laser pulse and we know the frequency at which this occurs, the number of gates is directly analogous to detection time. One detection gate means that we are looking at one pulse (which occurs every 20 ns), so one gate=20 ns. If we use 50 million gates, we are looking at the photon pairs generated by 50 M pulses which means we are detecting photons for 1 s (20 ns per gate*50 M gate=1 s). When we say that we are using count rates in the calibration process, we are actually measuring "x" counts detected during "y" gates and then saying the count rate is "x/y" counts per gate. Since gates can be directly transformed to time, as explained above, we can also say how many counts we have per time as opposed to per gate.

The system uses fairly complex and sophisticated equipment. NuCrypt of Evanston, Ill. manufactures equipment which may be assembled to provide the entanglement distribution system 10 according to some non-limiting exemplary embodiments. The inventors used this particular equipment in the research underlying their invention and it is being discussed herein for explanatory purposes.

The source of entangled photons pairs 11 may be the NuCrypt EPS-1000 Entangled Photon Source or EPS, for example. (More information is available online about the EPS-1000 at: http://nucrypt.net/EPS-1000.html). The NuCrypt EPS-1000 includes a laser 12 which generates signal and idler photons entangled in time-energy and polarization using a 1552.52 nm pulsed (50 MHz) pump and a dispersion shifted fiber (DSF) NLM 16 with its zero-dispersion wavelength centered near the pump wavelength. The EPS contains several WDM (wavelength division multiplexer) filters 17 in order to output four pairs of correlated signal and idler channels on the 100 MHz ITU grid, which are symmetric about the pump channel (1552.52 nm). The correlated signal and idler photons are then sent to two gated InGaAs single photon detectors $D_1$ and $D_2$ (~20% detection efficiency) which receive gate pulses that are synchronized with the pump pulse rate of the EPS. The NuCrypt Correlated Photon Detection System (CPDS) include two SPDs which may be used as detectors $D_1$ (20) and $D_2$ (21) along with all timing electronics 22 necessary to perform singles and coincidence counting measurements on the signal and idler photons.

The NuCrypt EPS-1000 source 11 may be controlled by NuCrypt's quantum system control software (QSCS) which may reside in a controller 30 and, when executed, provides a convenient GUI-based control of the entangled source (See http://nucrypt.net/quantum-system-control-software.html).

The variable attenuator 14 or VA is an internal component of the entangled photon source 11. A variable attenuation (VA) setting is set by the user with the QSCS GUI. The VA setting and attenuation have a linear relationship with respect to each other. For instance, for the NuCrypt EPS-1000, the VA setting values range from 3000-3600 (no units). These values are arbitrarily defined and device dependent. The VA setting is a key setting with respect to configuring the system for entangled photon generation. VA settings with the QSCS GUI can be set to 4 decimal places of precision, e.g., 3500.1234. The VA setting affects the attenuation level of the laser pump, which in turn, affects the power level of the laser 12. Attenuation is a logarithmic measure of power. The attenuating values may be given in decibels (dB) units and the laser power values give in micro-Watts (µW) units, for example. Although, it should be appreciated that other units might also be used instead for these parameters. (It is also noted that other systems might be operated by directly entering a dB attenuation or a power value as well).

There are the five key operational parameters that characterize the entangled photon distribution system and which are important to and used for calibrating for quantum measurements. They are as follows: µ the rate of generated entangled photon pairs by the photon source; $r_1$ and $r_2$, the rates of Raman-scattered photons generated in the first and second channels, respectively; and $\eta_1$ and $\eta_2$, the efficiency of the two detectors, respectively.

The entangled photon pair generation rate µ represents the probability that the source generates an entangled photon pair per unit time (equivalently, per laser pulse or per gate) in the channels' bandwidth (i.e., the bandwidths of channels 1 and 2). These photons are generated when two photons from a single laser pulse undergo FWM in the nonlinear medium. These are the desired photons for quantum networking application generated by the source. The values of µ may range from approximately $10^{-4}$–0.1 (0.0001–0.1), for example.

The Raman-scattered photon rates $r_1$ and $r_2$ represent the probability that a Raman-scattered noise photon is generated per unit time (again, can also say per pulse or per gate) in the bandwidth of channel 1 or channel 2. These photons are not entangled and are generated in fiber (which is what our source is made of). These photons are not only generated in fiber; they are generated in all $\chi^{(3)}$ materials. Silica (what fiber optics are typically made of) is a $\chi^{(3)}$ material; therefore, Raman photons are generated by the source 11. These are not desired, but they are present and therefore must be characterized. These photons are not present in entangled photon pair sources which use spontaneous parametric down-conversion (SPDC) in bulk crystals instead of FWM in fiber. Those systems have been very well characterized. The presence of Raman photons in a fiber-based system like ours complicates the detection probabilities (i.e., sI, $s_2$, and $c_{12}$ discussed below), and therefore, it is desirable to have a process to characterize them. The values of $r_1$ and $r_2$ may range from approximately $10^{-1}$–0.1 (0.01–0.1), for example.

The detector efficiencies $\eta_1$ and $\eta_2$ represent the probability that the detector generates an electrical output when there is an input photon. More generally, it is the probability that the detector determines there was a photon when there indeed was a photon. The detectors have of approximately 20% efficiency (so it only tells us there was photon for approximately every 1 out of 5 photons that actually reach the detector). The efficiency is a property of the detector itself and does not change for the different measurements that we take during the calibration process. Efficiencies much greater than 20% are not likely possible with conventional single photon detectors due to technical limitations of how the detectors operate.

The controller 30 may be configured to execute ordinary machine-executable instructions 31 to control and operate the entangled photon distribution system 10 in a conventional manner, such as via the aforementioned NuCrypt's quantum system control software in the case of using the NuCrypt's EPS-1000.

Not only this for ordinary control but the controller 30 may be further configured to execute machine-executable instructions 32 to implement the novel methodology for in-situ characterizing and calibrating the system 10 as further discussed below. The novel methodology allows fast characterization of the full entangled photon pair transmission system at previously unattainable high power levels by taking into account the high order photon emission effects. Furthermore, the method provides the ability to characterize an entanglement source without the need of independently measuring the Raman noise arising from the nonlinear conversion in $\chi^{(3)}$ medium such as fiber or a photonic waveguide. It also allows in-situ characterization without the need of any additional calibration equipment.

The controller 30 may be implemented as hardware, software or a combination thereof specifically configured to execute code or instructions necessary to implement embodiments of the present invention. Machine-executable instructions (such as software or machine code) can be stored in a memory device (not shown) and will be executed by the controller as needed. In some implementations, software code (instructions), firmware, or the like, may be stored on a computer or machine-readable storage media. The controller may be comprised of one or more processor devices. While both machine-executable instructions 31 and 32 are shown as part of the controller 30 in FIG. 1, it will be appreciated they could be executed by distinct processors thereof or, in other implementations, by processors of distinct and separate controllers altogether. The processor(s) may be a programmable processor, such as, for example, a field-programmable gate array (FPGA) or an application-specific integrated circuit (ASIC) processor. The methodology disclosed herein may be implemented and executed by an application created using any number of programming routines. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

FIG. 2A shows an overview of a method 200 for in-situ characterizing and calibrating an entangled photon distribution system 10 according to embodiments of the present invention.

In step 210, individual ($s_1$ and $s_2$) and coincidence ($c_{12}$) counting rates of the photon detectors are measured for at least two different operational settings of the source of entangled photon pairs 11. This can be achieved by changing the pump power level or the attenuating level thereof by varying known amounts. As to the latter, and as mentioned above, the VA setting of the attenuator 14 controls the attenuation level of a laser pump, which in turn, affects the power level of the laser 12. Attenuation is a logarithmic measure of power. The attenuating values may be given in decibels (dB) units and the laser power values give in micro-Watts (µW) units, for example. Depending on the particular system, power levels (µW), attenuation levels (dB) or device-specific attenuation units, such as NuCrypt's VA setting levels might be used for the operational setting of the source of entangled photon pairs 11. They all essentially relate the same result in terms of the operation setting, OS, of the system.

The operational setting level is set to a known value, A, so OS=A. With the operational setting now set, each of photon detectors $D_1$ (20) and $D_2$ (21) measures the number of individual photon detection events over a period of time t for first and second channels 18 and 19. The period of time t may be 1 second, for example. The detectors' counts should be reset (or initialized) beforehand. Together with the coincident counting electronics 22 record coincidences of the photons recorded by both detectors 20 and 21 at substantially the same time. Dividing the measured number of single and coincidence counts by the total measurement time t gives an averaged measured count rates of $s_1$, $s_2$, $c_{12}$ for detector 20 individually, detector 21 individually, and their coincidences, respectively. These measured count rates, in turn, correspond to detection probabilities.

For any subsequent operational setting(s), the pump power or attenuation level can be changed to a known value, A' or by a known, fixed amount power or attenuation spacing, ΔA, so that OS=A' or OS=A+ΔA. There are no specific minimum or maximum requirement on the spacing ΔA just that it be a known quantity. In general, the more detector count rates measurements that are made, the smaller the spacing ΔA can be made.

One part of the novelty of this methodology is that the user can take measurements in the higher-power regime (higher OS setting level) to characterize the system at all powers (low-power quantum regime and high power regime). Measurements are faster and more accurate at high power, so it is beneficial that we can characterize the system using these faster, more accurate measurements. The NuCrypt EPS-1000 typically operates at around VA=3100 or less corresponding to an attenuation level of about −9.6 dB or less for ordinary operation. Thus, VA settings above 3100 may preferably be used, with spacing (or delta) of 100 s, such as 3200, 3300, 3400, etc. These correspond to attenuation spacing of more or less −2 dB steps. Pump power step levels would rise at an exponential rate, if used. The methodology allows for using a much broader range of power/attenuation values.

Figure 2B:
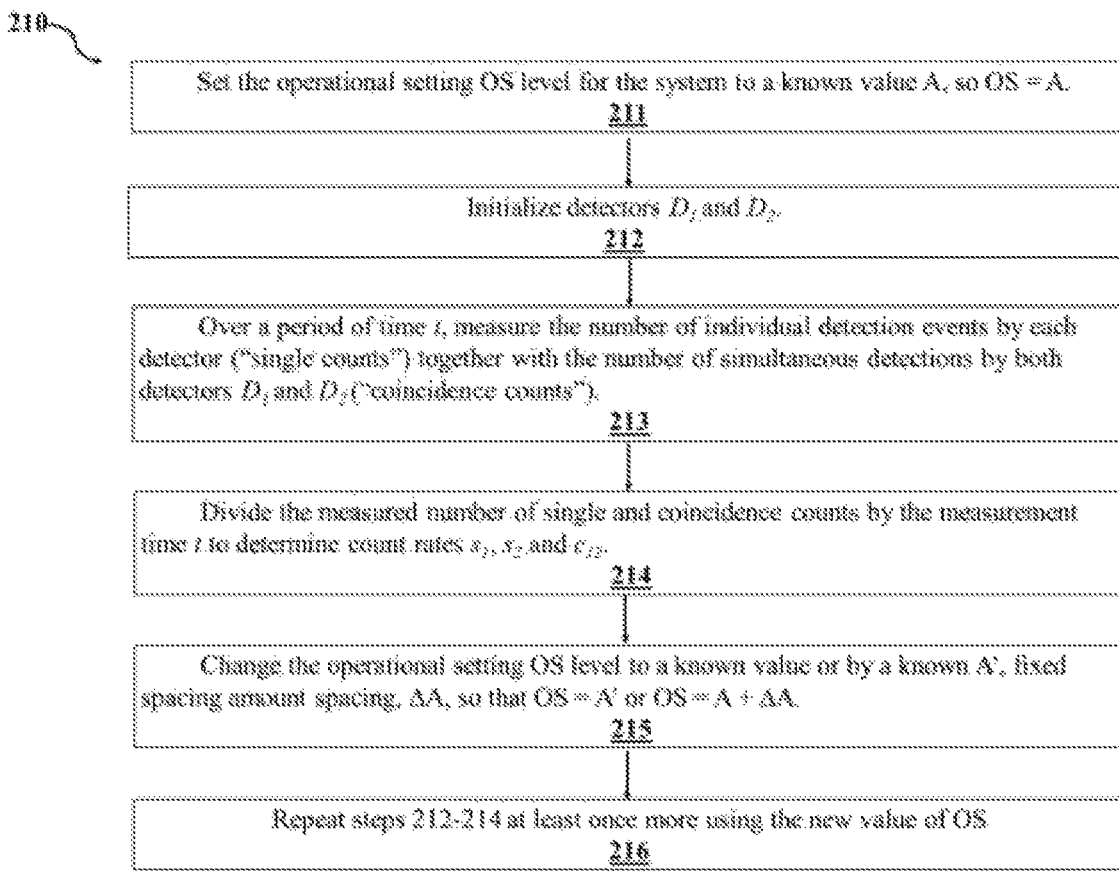
FIG. 2B is a flow chart of the count rate measurement sub-routine of the method according to embodiments.

The sub-steps of step 210 are summarized here and depicted in FIG. 2B as follows:
1. Set the operational setting level for the system to a known value A, so OS=A. (Step 211)
2. Initialize detectors $D_1$ and $D_2$. (Step 212)
3. Over a period of time t, measure the number of individual detection events by each detector ("single counts") together with the number of simultaneous detections by both detectors $D_1$ and $D_2$ ("coincidence counts"). (Step 213)
4. Divide the measured number of single and coincidence counts by the total measurement time t to determine count rates $s_1$, $s_2$, and $c_{12}$ and detection probabilities. (Step 214)
5. Change the operational setting level of the system to a known value or by a known A', fixed spacing amount spacing, ΔA, so that OS=A' or OS=A+ΔA. (Step 215)
6. Repeat steps 2-4 (Steps 212-214) at least once more using the new value of OS. (Step 216)

Next, in step 220, the measured individual and coincidence count rate data ($s_1$, $s_2$, and $c_{12}$) is fit with theoretical models of the detection probabilities including multi-photon effects for the detectors. It is believed that such a system has not been characterized beyond the approximation that only one pair is generated at a time. Likewise, detector efficiencies have been measured by similar techniques, such as those disclosed in X. Li, et al, "Quantum efficiency measurement of single-photon detectors using photon pairs generated in optical fibers," J. Opt. Soc. Am. B 27, 1857-1865 (2010); however, we believe this is the first simultaneous determination of the FWM rate, Raman scattering rates, and detector efficiencies with such a method.

First, we will derive the theoretical models of detection probabilities used by the method. And afterwards, fitting the measured individual and coincidence count rate data with the theoretical models will discussed.

Theoretical Modeling of Detection Probabilities

1. Single Count Rate of One Single Photon Detector

In order to accurately determine the entangled photon pair generation rate, Raman noise photon generation rates, and detector efficiencies; a model is developed to describe the probability with which each detector "clicks" (i.e. detects an incident photon).

The probability of a single photon detector detecting the output photons generated by a crystal-based entangled photon pair source can accurately be modelled. The behavior of a fiber-based entangled photon pair source can be accurately modeled by modifying the photon statistics used in the publication by J. Oh, C. Antonelli, and M. Brodsky, entitled "Coincidence rates for photon pairs in wdm environment," J. LightwavecTechnol. 29, 324-329 (2011), to include the probability of a Raman-scattered photon being detected. Given n pairs of photons, the probability that detector $D_i$ clicks, ignoring Raman-noise photons and dark counts, is given by:

$$\text{Prob}(D_i \text{ clicks}|n \text{ pairs})=1-(1-T_i\eta_i)^n, \quad (1)$$

based on the argument that the detector clicks as long as at least one of the n pairs is not lost.

Therefore, the overall probability that detector i clicks due to an incident photon is given by:

$$P_i^0=\text{Prob}(D_i \text{ clicks})=\Sigma_{n=0}^{\infty} P(n)\text{Prob}(D_i \text{ clicks}|n \text{ pairs}), \quad (2)$$

where P(n) is the photon number distribution of FWM-generated pair photons. For a multimode system (in frequency) such as disclosed herein, this can accurately be approximated as a Poissonian distribution with mean μ (i.e. the average number of pairs generated per pump pulse). Given a Poissonian distribution of FWM-generated pair photons, the probability of a click becomes:

$$P_i^0 = \sum_{n=0}^{\infty} \frac{\mu^n e^{-\mu}}{n!}[1-(1-T_i\eta_i)^n] \quad (3)$$
$$= 1 - \exp[-\mu T_i \eta_i]$$

In order to accurately model the probability of detecting a photon generated by a fiber-based entangled pair source, the probability of detecting a Raman-scattered noise photon must also be included.

Dark counts and noise photons due to self-phase modulation (SPM) of the pump were experimentally verified to be negligible in the publication by X. Ma, L. Yang, X. Guo, and X. Li, entitled "Generation of photon pairs in dispersion shift fibers through spontaneous four wave mixing: Influence of self-phase modulation," Opt. Commun. 284, 4558-4562 (2011), and can be included in a similar fashion, if necessary. However, they have been ignored here since they were verified to be negligible for the operating conditions of the source. To determine the probability that a detector clicks due to a FWM-generated pair photon or a Raman noise photon, the probability of a click due to a Raman photon can be included in a similar fashion to the probability of a click due to a pair photon. Inserting the actual probabilities into equations 1 and 2 results in the following probabilities (per detection gate) of singles and coincidence counts:

$$P_i = 1-(1-P_{R_i})(1-P_i^0) = P_i^0 + P_{R_i} - P_i^0 P_{R_i} \quad (4)$$

$P_i^0$ is the probability of a click due to a pair photon from Eq. 3 and $P_{R_i}$ is the probability of click due to a Raman photon, which has a form similar to $P^0$, but the Raman photon distribution has a mean value of $r_1$ or $r_2$ as opposed to Eq. 4 comes from the fact that no click occurs if there is no FWM-pair photon and no Raman photon; otherwise, there is a click.

Similar to the approximate distribution of FWM-pair photons, the Raman distribution can also be approximated as a Poissonian distribution due to the fact that the distribution of a multimode thermal source approaches a Poissonian distribution. Substituting in the expressions for the individual probabilities, the probability of a singles count, $s_i$, due to FWM-pair photons and Raman-scattered noise photons for a generic detector is expressed as:

$$s_i = 1 - \exp[-(\mu+r_i)T_i\eta_i] \quad (5)$$

The channel transmission rate variable, $T_i$, represents light transmission via the channel. Its value is somewhere between 0 (meaning no transmission of light) and 1 (complete transmission of light).

For the two detectors $D_1$ (20) and $D_2$ (21) in system of FIG. 1, equation 5 can be expressed more specifically as:

$$s_1 = 1 - \exp[-(\mu+r_1)T_1\eta_1] \quad (5a)$$

$$s_2 = 1 - \exp[-(\mu+r_2)T_2\eta_2] \quad (5b)$$

2. Coincidence Rate of Two Single Photon Detectors

Likewise, the probability of the two detectors $D_1$ and $D_2$ clicking at the same time (i.e. a coincidence count occurs) can be determined in a similar fashion. Given n pairs of photons are created by FWM, one travels in channel 1 and the other travels in channel 2. Therefore, the probability of a coincidence is simply given by the probability that both detectors click individually (Eq. 1). This of course follows from the fact that each photon of the pair was created simultaneously (due to their time-energy entanglement), and the assumption that channel 1 and channel 2 are the same length (experimental delays can easily be adjusted to make this a valid assumption). Therefore, the probability of a coincidence, given n pairs, is:

$$\begin{aligned}Prob(coin.\,|\,n \text{ pairs}) &= Prob(D_1 \text{ clicks}|\,n\text{ pairs}) \times \\ &\quad Prob(D_2 \text{ clicks}|\,n\text{ pairs}) \\ &= [1-(1-T_1\eta_1)^n][1-(1-T_2\eta_2)^n] \\ &= 1-(1-T_1\eta_1)^n-(1-T_2\eta_2)^n + \\ &\quad [(1-T_1\eta_1)(1-T_2\eta_2)]^n\end{aligned} \quad (6)$$

The overall probability of a coincidence is therefore given by:

$$P_{12}^0 = Prob(coin.) = \sum_{n=0}^{\infty}\mathcal{P}(n)Prob(coin.\,|\,n\text{ pairs}) \quad (7)$$

Given the Poissonian distribution of FWM-generated pair photons, the probability of a coincidence becomes:

$$\begin{aligned}P_{12}^0 &= \sum_{n=0}^{\infty}\frac{\mu^n e^{-\mu}}{n!}\{1-(1-T_1\eta_1)^n-(1-T_2\eta_2)^n + \\ &\quad [(1-T_1\eta_1)(1-T_2\eta_2)]^n\} \\ &= 1-\exp[-\mu T_1\eta_1]-\exp[-\mu T_2\eta_2] + \\ &\quad \exp[-\mu(T_1\eta_1+T_2\eta_2-T_1T_2\eta_1\eta_2)]\end{aligned} \quad (8)$$

The probability of a coincidence when including the possibility of detecting Raman photons in either or both channels can also be determined. Following similar logic for the various possibilities of a coincidence as used when determining the possibilities of a single detection in Eq. 4, the probability of a coincidence when considering FWM-pair photons and Raman photons is:

$$\begin{aligned}P_{12} = 1&-(1-P_{R_1})(1-P_{R_2})(1-P_{12}^0)-P_{R_1}(1-P_{R_2})(1-\\ &P_{12}^0)-P_{R_2}(1-P_{R_1})(1-P_{12}^0)\end{aligned} \quad (9)$$

Similar to Eq. 4, this reduces to:

$$P_{12} = P_{12}^0 + P_{R_1}P_{R_2} - P_{12}^0 P_{R_1}P_{R_2}. \quad (10)$$

Substituting the individual probabilities gives the probability of a coincidence count:

$$\begin{aligned}c_{12} = 1&-\exp[-\mu T_1\eta_1]-\exp[-\mu T_2\eta_2]+\exp[-\mu(T_1\eta_1+\\ &T_2\eta_2-T_1T_2\eta_1\eta_2)]+(1-\exp[-r_1T_1\eta_1])(1-\exp[-\\ &r_2T_2\eta_2])-(1-\exp[-r_1T_1\eta_1])(1-\exp[-r_2T_2\eta_2])\times\\ &\{1-\exp[-\mu T_1\eta_1]-\exp[-\mu T_2\eta_2]+\exp[-\mu(T_1\eta_1+\\ &T_2\eta_2-T_1T_2\eta_1\eta_2)]\},\end{aligned}$$

where $\mu$ is the rate of FWM-generated pairs, $r_i$ is the rate of Raman-scattered photons of channel i, $T_i$ is the transmission of channel i, and $\eta_i$ is the efficiency of detector i.

For method 200, we preferably keep all terms in the theoretical models. That is, no approximation with respect to power or attenuation is being made. In similar situations, people often make a "low-power" approximation and get rid of "high-order" terms. For example, exponentials (of which there are many in our expressions for $s_1$, $s_2$, $c_{12}$) can be Taylor-expanded to a sum of many different terms. For our $s_1$ expression, the first-order expression would be:

$$s1 = \mu T_i\eta_i + r_iT_i\eta_i \quad (A1)$$

This approximation in equation A1 is much simpler than the exponential form that we are using in our models, but it is not valid at high powers (i.e., approaching $\mu$=0.1). Therefore, it would be inaccurate to use this form in the "higher-power" regime that we propose using for embodiments of the present invention. Likewise, $c_{12}$ can be approximated to first-order as:

$$c12 = \mu T_1T_2\eta_1\eta_2 + r_2T_1T_2\eta_1\eta_2 \quad (A2)$$

Again, this approximation in equation A2 is only valid for low powers and not the higher-power regime we propose using in various embodiments of the invention.

Fitting the Measured Count Rate Data to the Detection Probability Models

A data fit using the aforementioned models can be performed as a function of pump power or attenuation. Since FWM is quadratic with respect to pump power, P, the average number of entangled photon pairs created per pulse per joint channel bandwidth can be approximated as $\mu \sim aP^2$. Using this approximately, we assume $\mu = aP^2$. Likewise, Raman scattering is linear in pump power P, and the Raman rates can be approximated as $r_i \sim b_iP$. Thus, we assume $r_1 = b_1P$ and $r_2 = b_2P$. In these expressions, a, $b_1$ and $b_2$ are constants.

For a system in which arbitrary device-specific attenuation level settings might be used, an additional equation may be substituted in the equations, which correlates the arbitrary device-specific units to actual attenuation levels (e.g., in dBs).

Making these substitutions allows us to replace $\mu$, $r_1$, and $r_2$ in Eqs. 5a, 5b and 11 with power (attenuation) dependent terms. These equations can then be used to fit singles and coincidence counting rates as a function of power in order to determine the relevant parameters of the entangled photon source and detection system When converting the equations from $\mu$, $r_1$, $r_2$ to pump power P, we substitute $\mu = a\, P^2$, $r_1 = b_1 P$, and $r_2 = b_2 P$ into Eqs 5a, 5b and 11 of to yield:

$$s_1 = 1 - \exp[-(aP^2 + b_1 P)T_1\eta_1] \tag{12a}$$

$$s_2 = 1 - \exp[-(aP^2 + b_2 P)T_2\eta_2] \tag{12b}$$

$$\begin{aligned}c_{12} = &1 - \exp[-T_1\eta_1 aP^2] - \exp[-T_2\eta_2 aP^2] + \\ &\exp[-aP^2(T_1\eta_1 + T_2\eta_2 - T_1 T_2 \eta_1 \eta_2)] + \\ &(1 - \exp[-T_1\eta_1 b_1 P])(1 - \exp[-T_2\eta_2 b_2 P]) - \\ &(1 - \exp[-T_1\eta_1 b_1 P])(1 - \exp[-T_2\eta_2 b_2 P])\{1 - \exp[-T_1\eta_1 aP^2] - \\ &\exp[-T_2\eta_2 aP^2] + \exp[-aP^2(T_1\eta_1 + T_2\eta_2 - T_1 T_2 \eta_1 \eta_2)]\}\end{aligned} \tag{12c}$$

The fit may be performed as a function of pump power, P, with a, $b_1$, $b_2$, $\eta_1$, and $\eta_2$ as free parameters. Once the constants, a, $b_1$, and $b_2$ are determined by the fit they are then substituted back into the equations $\mu = a\, P^2$, $r_1 = b_1 P$, $r_2 = b_2 P$ in order to determine the desired parameters $\mu$, $r_1$, and $r_2$.

If desired, the fit can be performed as a function of attenuation instead of power. This allows the calibration process to be performed only with knowledge of attenuation/relative laser power instead of requiring the absolute laser power. By using the power-attenuation relation, att=10 $\log_{10}$ (P/$P_{max}$), one can make the substitution P=$10^{att/10}$ $P_{max}$ in the previous equations to get:

$$s_1 = 1 - \exp[-(a\, P_{max}^2 * 10^{att/5} + b_1 P_{max} * 10^{att/10}) T_1 \eta_1] \tag{13a}$$

$$s_2 = 1 - \exp[-(a\, P_{max}^2 * 10^{att/5} + b_2 P_{max} * 10^{att/10}) T_2 \eta_2] \tag{13b}$$

$$\begin{aligned}c_{12} = &1 - \exp[-T_1\eta_1 a\, P_{max}^2 * 10^{att/5}] - \exp[-T_2\eta_2 a\, P_{max}^2 * 10^{att/5}] - \exp[-a\, P_{max}^2 * 10^{att/5}(T_1\eta_1 + \\ & T_2\eta_2 - T_1 T_2\eta_1\eta_2)] + (1 - \exp[-T_1\eta_1 b_1 P_{max} * 10^{att/10}])(1 - \exp[-T_2\eta_2 b_2 P_{max} * 10^{att/10}])(1 - \exp[-T_1\eta_1 b_1 P_{max} * 10^{att/10}])(1 - \exp[-T_2\eta_2 b_2 P_{max} * 10^{att/10}])\{1 - \exp[-T_1\eta_1 a\, P_{max}^2 * 10^{att/5}] - \exp[-T_2\eta_2 a\, P_{max}^2 * 10^{att/5}] - \exp[-a\, P_{max}^2 * 10^{att/5}(T_1\eta_1 + T_2\eta_2 - T_1 T_2 \eta_1 \eta_2)]\}\end{aligned} \tag{13c}$$

Equations 13a, 13b, and 13c might be further modified for a device-specific attenuation setting if desired. For instance, the attenuation value att therein may be substituted with an expression or mapping which correlates attenuation values with the device-specific attention setting values, such as the VA setting levels 3000-3600 used with the NuCrypt's quantum system control software. As mentioned above, there is a substantially linear relationship between them.

Since we are only interested in the parameters $\mu$, $r_1$, and $r_2$; and $P_{max}$ is not independent of a, $b_1$, and $b_2$ (i.e. it only appears as a $P_{max}^2$, $b_1 P_{max}$, and $b_2\, P_{max}$), the actual value of $P_{max}$ is not of any significance. Changing its value results in different fitted values of a, $b_1$, and $b_2$; but the values of $\mu$, $r_1$, and $r_2$ will not change. Therefore, it is easiest to set $P_{max}=1$ and remove it from the above equations.

The channel transmission rates $T_1$ and $T_2$ in equations 12a-c and 13a-c can be measured by standard techniques with an ordinary light power meter as follows:

1. Measure power of a reference light source, $P_{in}$.
2. Use the reference source as the input to the channel.
3. Measure power at the output of the channel, $P_{out}$.
4. T=$P_{out}/P_{in}$.

The channel transmission rates $T_1$ and $T_2$ should be determined each time changes are made to the system, such as, when connecting and disconnecting fiber optic components, the transmission changes (often a non-negligible amount), or each time an element is added or removed. This is part of the novelty of the methodology: Since no additional equipment is required to completely characterize all relevant parameters, there is no need to reconnect any equipment when transitioning from the characterization/calibration process to performing actual experiments. Therefore, all five parameters ($\mu$, $r_1$, $r_2$, $\eta_1$ and $\eta_2$) can be determined with minimal changes in the channel transmission rates T.

In step 230, the five operational parameters of the system ($\mu$, $r_1$, $r_2$, $\eta_1$, and $\eta_2$) are determined (e.g., extracted) from the fitting. There are three equations (12a, 12b, 12c or 13a, 13b, 13c) and five unknowns. Thus, the equations above cannot be analytically solved for each variable. One, however, can perform a weighted nonlinear least squares regression to solve for the unknowns. See, e.g., K. F. Riley, M. P. Hobson, and S. J. Bence, *Mathematical Methods for Physics and Engineering*, $3^{rd}$ edition (Cambridge University Press, 2006), pp. 1271-1277, herein incorporated by reference. To better automate the process, the "NonlinearModelFit" function of Wolfram® mathematical software can be used, for example, as discussed at http://reference.wolfram.com/language/red/NonlinearModelFit.html.

The measured singles counts and coincidences are fit with equations 12a-c or equations 13a-c, respectively, and the rate $\mu$, the Raman rates $r_1$ and $r_2$ and the detector efficiencies $\eta_1$, and $\eta_2$, are simultaneously determined from the fitting. Detailed analysis, below, shows that the higher-order terms of Equations 12a-c and 13 a-c are negligible for the singles counts, but they clearly begin to contribute to the coincidence counts for the higher powers that were tested. Therefore, the models presented here account for contributions of multi-pair events which have been neglected in prior characterizations of fiber-based entangled pair sources.

Furthermore, by altering the fitting process to only include a limited number of data points, it is shown that as few as two measurements in the high power regime are sufficient to fully characterize the system. Such a condition allows fast and accurate characterization of the system in the lower power, high-fidelity regime by measuring the system in the less noisy high power regime.

Examples: Data and Results

The following details one exemplary experimental setup used by the inventors. The entangled photon source here is a NuCrypt EPS-1000 which generates signal and idler photons entangled in time-energy and polarization using a 1552.52 nm pulsed (50 MHz) pump and a dispersion shifted fiber with its zero-dispersion wavelength centered near the pump wavelength. The EPS contains several WDM (wavelength division multiplexer) filters in order to output four pairs of correlated signal and idler channels on the 100 MHz ITU grid, which are symmetric about the pump channel 31 (1552.52 nm). The signal and idler channel pairs that are used are channels 26/36, 27/35, 28/34, and 29/33. The correlated signal and idler photons are then sent to two gated InGaAs single photon detectors (~20% detection efficiency) which receive gate pulses that are synchronized with the pump pulse rate of the EPS. The detectors are part of the NuCrypt Correlated Photon Detection System (CPDS) which also contains all timing electronics necessary to perform singles and coincidence counting measurements on the signal and idler photons.

In order to reliably operate any entangled photon source and detector system, the user must have knowledge of the photon pair generation rates and the detector efficiencies. As mentioned earlier, fiber-based sources, such as the one used here, generate significant amounts of Raman-scattered photons, and the rate at which these are generated in each channel must also be known. In order to determine all of these parameters, one typically requires knowledge of the detector efficiencies or the Raman-noise photon rate in advance of determining the remaining parameters. However, the method described here simultaneously determines all five of these operational parameters with one procedure.

First, the variable attenuator (VA) 14 in FIG. 1 is set to a first attenuation level. Next, the singles and coincidence count rates of detectors $D_1$ and $D_2$ are measured. Then the attenuation of the pump is changed using the VA, and the singles and coincidence rates are measured again. This process is repeated for as few as two different attenuation values, and the measured count rates are theoretically modeled with a, $b_1$, $b_2$, $\eta_1$, and $\eta_2$ as free or unknown parameters. Finally, the pair generation rate $\mu$, Raman rates in the signal and idler channels $r_1$ and $r_2$, and detector efficiencies $\eta_1$ and $\eta_2$ are all determined from the fit.

Table 1, below, show data for one particular calibration routine in accordance with a non-limiting embodiment of the invention. It shows the input to the EPS. Here, the VA setting levels that were used were: 3000, 3100, 3200, 3300, 3400, 3500, and 3600 (delta=100). The VA setting levels were manually input in the EPS control box in the NuCrypt's QSCS GUI. The corresponding attenuation and power setting for the system are also given.

TABLE 1

Exemplary Power/Attenuation values used for calibration routine

| power (μW) | attenuation (dB) | VA setting | Δatt (dB) |
|---|---|---|---|
| 6.54 | −11.96 | 3000 | — |
| 11.25 | −9.57 | 3100 | −2.39 |
| 18.75 | −7.36 | 3200 | −2.21 |
| 31 | −5.17 | 3300 | −2.19 |
| 49 | −3.18 | 3400 | −1.99 |
| 72.75 | −1.47 | 3500 | −1.71 |
| 102 | 0 | 3600 | −1.47 |

Single and coincidences count rates $s_1$, $s_2$ and $c_{12}$ were measured and recorded when attenuating the pump by various amounts (following step 210 in method 200).

Figure 3:
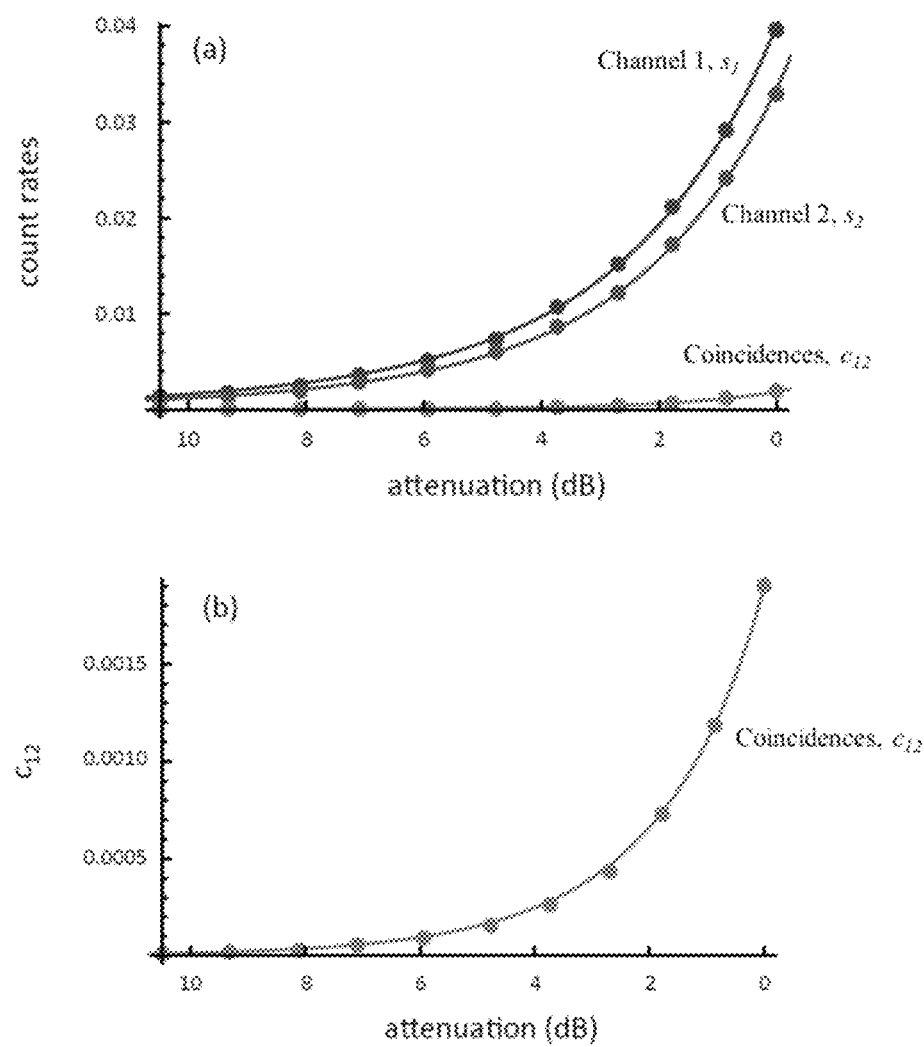
FIG. 3 is a graphical illustration showing the individual and coincidence rates versus attenuation for the two channels in plot (a). A magnified plot of the coincidence rate is shown in plot (b).

FIG. 3 is a graphical illustration showing the individual and coincidence rates versus attenuation for the two channels in plot (a). A magnified plot of the coincidence rate is shown in plot (b).

The measured singles and coincidence data were taken over a 10 dB range of pump attenuation, and were fit to the theoretical models described in Eqs. 12a, 12b, and 12c for pump power using a weighted least squares regression. Alternatively Eqs. 13a, 13b, and 13c could have been used for attenuation. The weight of each data point in determining the fit was determined from the measured standard deviation of the count rates at each value of the attenuation (determined from ten consecutive measurements at each attenuation). Specifically, the weight of each point was $w(att)=1/\sigma^2(att)$. The results shown in FIG. 3 for measurements over 5000 detection gates (100 μs) as a function of pump power (μW).

Using the equations 12a, 12b, and 12c, the five operational parameters of the system ($\mu$, $r_1$, $r_2$, $\eta_1$, and $\eta_2$) were determined from the fit. They are detailed in Table 2,

TABLE 2

Exemplary operational parameters ($\mu$, $r_1$, $r_2$, $\eta_1$, and $\eta_2$) determined from the fit along with the corresponding power, attenuation and VA settings

| power (μW) | attenuation (dB) | VA setting | μ | $r_1$ | $r_2$ | $\eta_1$ | $\eta_2$ |
|---|---|---|---|---|---|---|---|
| 6.54 | −11.96 | 3000 | 0.000448232 | 0.00653357 | 0.00560337 | 19.4% | 19.7% |
| 11.25 | −9.57 | 3100 | 0.00134271 | 0.0113081 | 0.00969815 | 19.4% | 19.7% |
| 18.75 | −7.36 | 3200 | 0.00372974 | 0.0188468 | 0.0161636 | 19.4% | 19.7% |
| 31 | −5.17 | 3300 | 0.0101953 | 0.0311601 | 0.0267238 | 19.4% | 19.7% |
| 49 | −3.18 | 3400 | 0.0254723 | 0.0492531 | 0.0422408 | 19.4% | 19.7% |
| 72.75 | −1.47 | 3500 | 0.0561491 | 0.0731258 | 0.0627147 | 19.4% | 19.7% |
| 102 | 0 | 3600 | 0.110377 | 0.102527 | 0.0879299 | 19.4% | 19.7% |

The detector efficiencies do not change so $\eta_1$ and $\eta_2$ are the same for each row.

Figure 4:
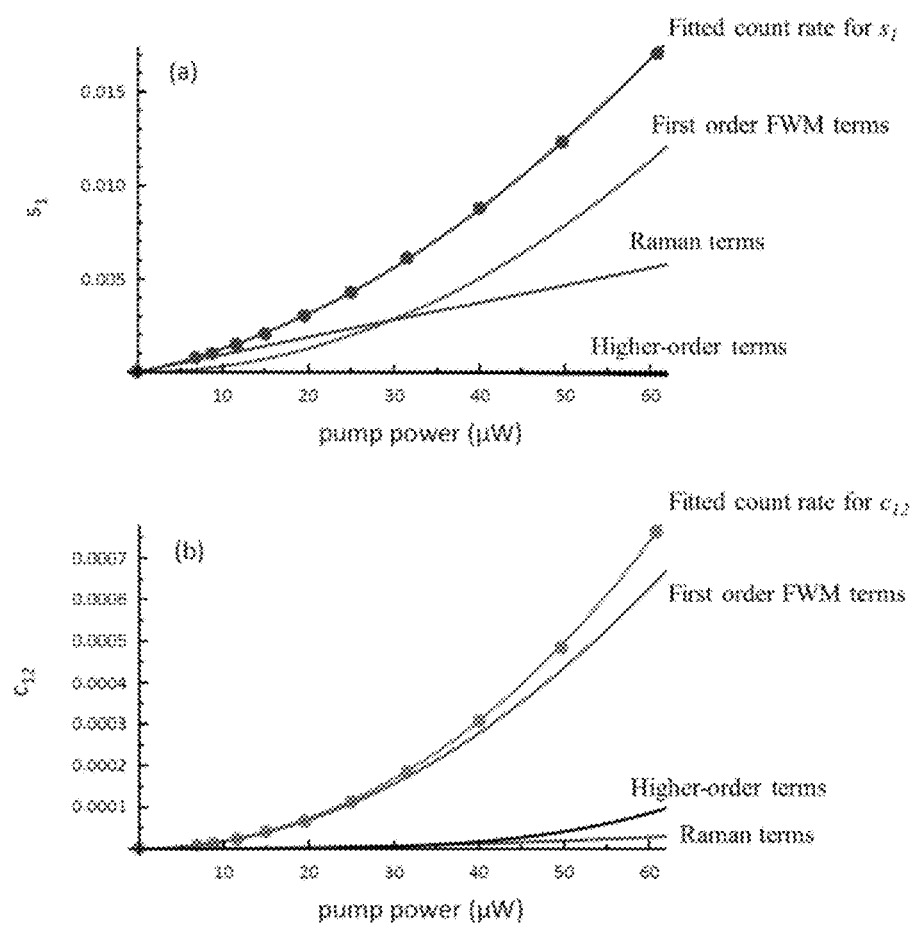
FIG. 4 shows plots for the fit individual detector rate curve (a) and the coincidence rate curve (b) as a function of power along with the contributions from all higher-order terms.

The first order contributions of FWM-generated entangled pairs and Raman-scattered noise photons to the counting rates can also be distinguished in order to analyze the relative amount of pair photons and noise photons generated for each value of the pump attenuation. These terms are plotted in FIG. 4, along with the constituent contributions in the models for various terms.

The fitted count rates curves $s_1$ and $c_{12}$ are shown along with their contributions. These include first-order FWM terms, Raman terms, all other higher-order terms. The contribution of all high-order terms is largely negligible with respect to the single detection rate curved $s_1$; however, it is more significant with respect to the coincidence rate curve $c_{12}$ and thus should not be ignored in the model.

In order to verify the accuracy of the fitted parameters, the fitted detector efficiencies $\eta_1$ and $\eta_2$ were compared to traditional measurements of the detector efficiencies using a calibrated setup consisting of a fiber coupler which splits an incoming signal to the SPD and another path with a power meter preceded by >50 dB of in-line fiber attenuators. By measuring the relative transmission of the channels leading to the SPD and attenuated power meter, the average number of photons incident on the SPD can be calculated (to within the uncertainty of the transmission of each channel). Table 3, below, shows the fitted detector efficiencies $\eta_1$ and $\eta_2$ for varying measurement lengths (gates) along with the directly measured efficiencies for comparison.

TABLE 3

Table of calculated detector efficiencies as a function of measurement gates.

| gates | $R^2$ of fit | meas. $\eta_1$ | fitted $\eta_1$ | meas. $\eta_2$ | fitted $\eta 2_1$ |
|---|---|---|---|---|---|
| 50M  | 0.9997 | 20.2 ± 0.5 | 21.0 ± 1.0 | 20.4 ± 0.5 | 21.3 ± 0.9 |
| 5M   | 0.9997 |            | 21.1 ± 1.1 |            | 21.4 ± 1.0 |
| 500k | 0.9997 |            | 20.0 ± 1.1 |            | 20.3 ± 0.9 |
| 50k  | 0.9997 |            | 19.4 ± 1.0 |            | 19.7 ± 0.8 |
| 5k   | 0.9996 |            | 19.4 ± 1.1 |            | 20.8 ± 1.1 |

Figure 5:
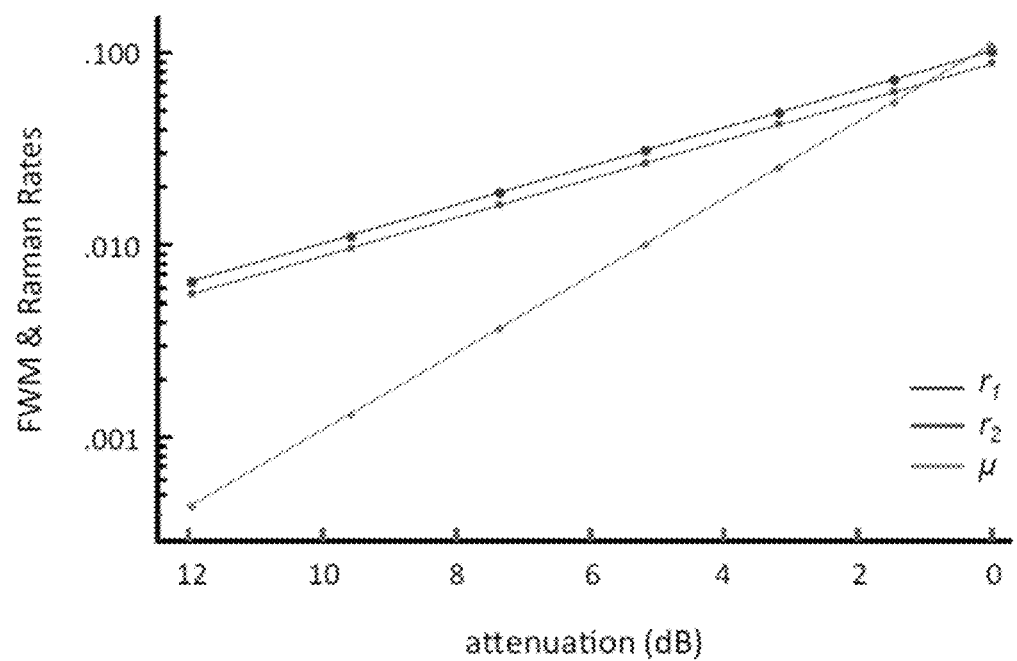
FIG. 5 is a plot of the entangled pair generation rate $\mu$ and the Raman-scattered noise photon rates $r_1$ and $r_2$ in each channel as a function of attenuation determined by fitting.

In addition to the detector efficiencies, the fitted model also outputs the FWM entangled pair generation rate μ and the Raman-noise photon rates $r_1$ and $r_2$ in each channel as a function of attenuation. These are plotted in FIG. 5 for the case of 50 M measurement gates. For quantum experiments, the user can select a value for μ, $r_1$ or $r_2$ and configure the system at the particular power or attenuation level which corresponds to that desired value of μ, $r_1$ or $r_2$. Using the data plotted in FIG. 5, if the user seeks μ=0.001 then the corresponding attenuation level of the entangled pair source 11 is set to −10 dB. There may be a tradeoff in terms of system performance as specific values of μ, $r_1$ and $r_2$ cannot all be set independent of each other. By setting the attenuation of the entangled pair source 11 in order to achieve a specific value for one of the parameters (μ, $r_1$, or r2), the other two parameters are also set to a value based on the chosen attenuation setting. The values of η1 and η2 do not significantly change as they are specific to the particular detector operation settings; they cannot be changed without changing the detector settings (i.e. they are not affected by changing the attenuation of the source).

It is clear that the fitted detector efficiencies agree with the directly measured detector efficiencies for all measurement times. The $R^2$ value (coefficient of determination) of a fit determines how well the model fits the data; $R^2 \sim 1$ means that the model accurately describes the data, and $R^2 \sim 0$ means that the model does not accurately describe the data. As seen in Table 3, the $R^2$ values for each measurement time are very close to one. Combined with the fact that the fitted detector efficiencies agree with the directly measured detector efficiencies and the calculated pair generation and Raman rates follow their expected behavior, this conveys that the model accurately describes the data. Therefore, the process described here has accurately determined all of the relevant parameters of the entangled photon pair source and detection system. It is also important to note that the $R^2$ value can sometimes misrepresent the ability with which a model describes a dataset. In these cases, there are typically noticeable patterns in the residual plots of the fit. The residuals of our fits show no such pattern; therefore, the $R^2$ value can be trusted as a sufficient measure of the goodness-of-fit.

Aspects concerning this invention have been previously disclosed by the inventors in the following conference presentations and papers herein incorporated by reference in their entireties:

"In-situ calibration of fiber-optics entangled photon distribution system" by D. E. Jones, B. T. Kirby and M. Brodsky at 2017 IEEE Photonics Society Summer Topical Meeting Series (SUM), San Juan, PR. 10-12 Jul. 2017 (corresponding paper published as D. E. Jones, B. T. Kirby and M. Brodsky, "In-situ calibration of fiber-optics entangled photon distribution system," 2017 IEEE Photonics Society Summer Topical Meeting Series (SUM), San Juan, 2017, pp. 123-124);

"Characterization of detector efficiencies with a high intensity source of entangled photon pairs in the presence of Raman noise" by D. E. Jones, B. T. Kirby and M. Brodsky at Single Photon Workshop 2017, Boulder, Colo., Jul. 31-Aug. 4, 2017"; and "Joint Characterization of Two Single Photon Detectors with a Fiber-based Source of Entangled Photon Pairs" by D. E. Jones, B. T. Kirby and M. Brodsky at Frontiers in Optics 2017, Washington, D.C., 18-21 Sep. 2017 (corresponding paper published as D. E. Jones, B. T. Kirby, and M. Brodsky, "Joint Characterization of Two Single Photon Detectors with a Fiber-based Source of Entangled Photon Pairs," in Frontiers in Optics 2017, OSA Technical Digest (online) (Optical Society of America, 2017), paper JW4A.37).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

We claim:

1. A method for characterizing and calibrating an entangled photon distribution system having a fiber-based $\chi^{(3)}$ non-linear source of entangled photon pairs which generates entangled photon pairs and appreciable Raman-scattered noise photons, and two photon detectors which detect photons among two channels, the method comprising:

for at least two different operational setting levels of the fiber-based $\chi^{(3)}$ non-linear source of entangled photon pairs, measuring count rates for photons detected by the two photon detectors, individually and coincidently;

fitting the measured individual and coincidence count rate data for the at least two different operational setting levels with theoretical models of detection probability which account for Raman-scattered noise photons in the system; and determining operational parameters of the system from the fitting.

2. The method of claim 1, wherein (i) a power setting, (ii) an attenuation setting, or (iii) a device-specific attenuation setting is used for the at least two different operational setting levels of the source of entangled photon pairs.

3. The method of claim 1, wherein the determined operational parameters of the system comprise:

μ, the rate of generated entangled photon pairs by the source;

$r_1$ and $r_2$, the rates of Raman-scattered noise photons generated in the first and second channels, respectively; and $\eta_1$ and $\eta_2$, the efficiency of the two photon detectors, respectively.

4. The method of claim 1, wherein measuring count rates for photons detected by the two detectors comprises:

initializing the two photon detectors for counting;

detecting individual photons and coincidences by the two photon detectors over a time period; and dividing the detected number of single and coincidence counts by the measurement time period to give measured count rates for the two detectors individually and coincidently.

5. The method of claim 4, wherein the actual time that transpired during the period or the gate timing of the detectors over the period may be used for the measurement time.

6. The method of claim 4, further comprising:
changing the operational setting level of the source of entangled photon pairs to a known value or by a known fixed spacing amount after measurement of the count rate for photons detected by the two photon detectors; and
using the changed value for the operational setting level of the photon source in a subsequent measurement of the count rate for photons detected by the two detectors.

7. The method of claim 1, wherein at least one of the operational setting levels of the source of entangled photon pairs is in a higher-power regime than ordinary used for operation.

8. The method of claim 1, wherein the theoretical models of detection probability which account for Raman-scattered noise photons in the system comprise:
a theoretical model for the count rate of a single photon being detected; and
a theoretical model for the coincidence rate of the two photons being detected.

9. The method of claim 8, wherein the theoretical models which account for Raman-scattered noise photons in the system are functions of: (i) power as set forth in Equations 12a, 12b, and 12c, or (ii) attenuation as set forth in Equations 13a, 13b, and 13c.

10. The method of claim 9, wherein there are no approximations with respect to power or attenuation made in the models.

11. The method of claim 1, wherein, in determining the operational parameters of the system from the fitting, performing a weighted nonlinear least squares regression to solve for unknowns.

12. The method of claim 1, further comprising:
determining the transmission rate of photons for each channel.

13. The method of claim 1, further comprising:
selecting at least one operational parameter of the system as determined; and
operating the system with an operational setting corresponding to the selected at least one operational parameter.

14. The method of claim 13, wherein the method does not require additional equipment or one to disassemble and reassemble the system when switching from the characterization and calibration method to the operating process.

15. An entangled photon distribution system comprising:
a fiber-based $\chi^{(3)}$ non-linear source which generates pairs of entangled photon pairs and appreciable Raman-scattered noise photons;
two photon detectors which detect photons among two channels; and
a controller configured to:
for at least two different operational setting levels of the fiber-based $\chi^{(3)}$ non-linear source of entangled photon pairs, measure count rates for photons detected by the two photon detectors, individually and coincidently;
fit the measured individual and coincidence count rate data for the at least two different operational setting levels with theoretical models of detection probability which account for Raman-scattered noise photons in the system; and
determine operational parameters of the system from the fitting.

16. The system of claim 15, wherein the fiber-based $\chi^{(3)}$ non-linear source of entangled photon pairs comprises:
a laser which emits pulses used to generate entangled pairs of photons;
a non-linear medium for generating entangled photons pairs from pulses emitted by the laser; and
a filter for selectively separating photons for transmission among the two channels.

17. The system of claim 15, wherein the fiber-based $\chi^{(3)}$ non-linear photon source is configured to generate entangled photon pairs by Four-Wave Mixing (FWM).

18. A controller for use with an entangled photon distribution system having a fiber-based $\chi^{(3)}$ non-linear source of entangled photon pairs which generates entangled photon pairs and appreciable Raman-scattered noise photons, and two photon detectors which detect photons among two channels, the controller configured to execute machine-executable instructions enabling the controller to implement a method comprising:
for at least two different operational setting levels of the fiber-based $\chi^{(3)}$ non-linear source of entangled photon pairs, measuring count rates for photons detected by the two photon detectors, individually and coincidently;
fitting the measured individual and coincidence count rate data for the at least two different operational setting levels with theoretical models of detection probability which account for Raman-scattered noise photons in the system; and
determining operational parameters of the system from the fitting.

* * * * *